United States Patent
Seo et al.

(10) Patent No.: US 10,637,822 B2
(45) Date of Patent: Apr. 28, 2020

(54) METHOD AND DEVICE FOR MANAGING IDENTIFIER OF EUICC

(71) Applicant: SAMSUNG ELECTRONICS CO., LTD., Suwon-si (KR)

(72) Inventors: Myoung Hee Seo, Seoul (KR); Kwan Lae Kim, Seoul (KR); Chul Hyun Park, Seoul (KR); Jin Hyoung Lee, Seoul (KR); Hyung Jin Lee, Seoul (KR); Youn Pil Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1018 days.

(21) Appl. No.: 14/430,458

(22) PCT Filed: Sep. 12, 2013

(86) PCT No.: PCT/KR2013/008278
§ 371 (c)(1),
(2) Date: Mar. 23, 2015

(87) PCT Pub. No.: WO2014/046421
PCT Pub. Date: Mar. 27, 2014

(65) Prior Publication Data
US 2015/0319133 A1 Nov. 5, 2015

(30) Foreign Application Priority Data

Sep. 24, 2012 (KR) .......................... 10-2012-0105632
May 24, 2013 (KR) .......................... 10-2013-0058918

(51) Int. Cl.
*G06F 15/16* (2006.01)
*H04L 29/12* (2006.01)
(Continued)

(52) U.S. Cl.
CPC ........ *H04L 61/1588* (2013.01); *H04L 67/303* (2013.01); *H04W 8/20* (2013.01)

(58) Field of Classification Search
CPC ..... H04L 61/1588; H04L 67/303; H04W 8/20
(Continued)

(56) References Cited

U.S. PATENT DOCUMENTS

2003/0147534 A1* 8/2003 Ablay ................... H04L 9/3271
380/270
2008/0057892 A1* 3/2008 Taaghol ................ H04W 8/183
455/187.1
(Continued)

FOREIGN PATENT DOCUMENTS

KR 10-2009-0056322 A 6/2009
KR 10-2012-0047813 A 5/2012
WO 2012/076437 A2 6/2012

OTHER PUBLICATIONS

International Search Report of PCT/KR2013/008278, dated Jan. 2, 2014. [PCT/ISA/210].

*Primary Examiner* — Oscar A Louie
*Assistant Examiner* — Oluwatosin M Gidado
(74) *Attorney, Agent, or Firm* — Sughrue Mion, PLLC

(57) ABSTRACT

A method and device for managing an identifier of an embedded universal integrated circuit card (eUICC) is disclosed. The eUICC receives an identifier information request, determines whether there is a network carrier profile in an enabled state, and provides a response with identifier information corresponding to the identifier information request based on the results of the determination. According to the method, it is possible to separately manage the unique identifier of the eUICC and a network carrier ICCID and to dynamically manage the identifier of the eUICC according to the state of the network carrier profile of the eUICC.

19 Claims, 4 Drawing Sheets

(51) Int. Cl.
*H04L 29/08* (2006.01)
*H04W 8/20* (2009.01)

(58) Field of Classification Search
USPC .......................................................... 709/223
See application file for complete search history.

(56) References Cited

U.S. PATENT DOCUMENTS

| | | | |
|---|---|---|---|
| 2010/0203864 A1* | 8/2010 | Howard | H04W 8/18 |
| | | | 455/411 |
| 2011/0281551 A1 | 11/2011 | Gonzalez et al. | |
| 2012/0122423 A1 | 5/2012 | Helmreich | |
| 2013/0231087 A1* | 9/2013 | O'Leary | H04W 8/22 |
| | | | 455/411 |
| 2014/0004827 A1* | 1/2014 | O'Leary | H04W 8/22 |
| | | | 455/411 |
| 2014/0051422 A1* | 2/2014 | Mittal | H04W 12/04 |
| | | | 455/419 |

* cited by examiner

METHOD AND DEVICE FOR MANAGING IDENTIFIER OF EUICC

CROSS-REFERENCE TO RELATED APPLICATIONS

This application claims the benefit of priority from Korean Patent Application No. 10-2012-0105632, filed on Sep. 24, 2012 and Korean Patent Application No. 10-2013-0058918, filed on May 24, 2013, in the Korean Intellectual Property Office, the disclosures of which are incorporated herein by reference in their entirety. This application is a National Stage Entry of the PCT Application No. PCT/KR2013/008278 filed on Sep. 12, 2013, the entire disclosure of which is also incorporated herein by reference in its entirety.

BACKGROUND

1. Field

An apparatus and a method consistent with exemplary embodiments broadly relate to an identifier management method and device of an embedded universal integrated circuit card (eUICC), and more particularly, to a method and device for an eUICC managing an identifier according to a state of a network operator profile.

2. Description of Related Art

A universal integrated circuit card (UICC) is a smart card that is tangible and may be inserted into a terminal and configured to authenticate a network access. The UICC may include a network access application (NAA) for accessing several networks of an operator, such as a universal subscriber identity module (USIM) for accessing a WCDMA/LTE network and a subscriber identity module (SIM) for accessing a GSM network.

In an existing removable UICC, an integrated circuit card identification (ICCID) information value is recorded and used as an identifier of the UICC when a card is manufactured, and is not changed after becoming commercially available. In addition, the ICCID value is a value including a unique code (a network operator identification number composed of a country code and an operator code, for example, public land mobile network (PLMN)) of a network operator (mobile network operator, MNO). The ICCID value is allocated by the network operator and used, as an identifier of the UICC, to perform billing or inventory management in a network operator system.

For a terminal requiring miniaturization and durability, such as a machine to machine (M2M) terminal, an embedded SIM (hereinafter referred to as eSIM or eUICC) that is integrally installed into the terminal at the time of manufacture has been proposed instead of the existing removable UICC.

The embedded universal integrated circuit card (eUICC) provides a network access authentication function like the existing removable UICC. However, access to networks of several providers should be processed using one eUICC because of a difference in physical structures. Furthermore, there are many issues such as eUICC opening, eUICC distribution, and eUICC subscriber information security, and thus, solutions for the issues need to be provided. In order to solve this, international standardization organizations such as GSMA and ETSI have developed standardization elements on necessary elements including a top structure together with related companies such as network operators, manufacturers, SIM vendors, and so on.

An external management system such as the subscriber manager (SM) has to record an unchanged unique value to identify the eUICC when the eUICC is manufactured. The network operator needs to allocate a unique ICCID value in order for the existing system to support the eUICC, and the system needs to manage the allocated unique ICCID value.

However, since the eUICC is installed in a terminal before the network operator is determined because of physical characteristics, the network operator cannot allocate and record the ICCID value when the eUICC is manufactured, and thus it is impossible to respond to an identifier information request including the ICCID.

SUMMARY

An aspect of exemplary embodiments is to provide an identifier management method of an eUICC, which manages a unique identifier of the eUICC and an ICCID of a network operator separately and dynamically manages the identifier of the eUICC according to a state of a network operator profile of the eUICC.

Another aspect of exemplary embodiments is to provide an identifier management device of the eUICC that performs the above method.

Illustrative, non-limiting embodiments may overcome the above disadvantages and other disadvantages not described above. The inventive concept is not necessarily required to overcome any of the disadvantages described above, and the illustrative, non-limiting embodiments may not overcome any of the problems described above. The appended claims should be consulted to ascertain the true scope of an inventive concept.

According to an exemplary embodiment, an identifier management method of an embedded universal integrated circuit card (eUICC) is provided. The method includes receiving, by the eUICC, an identifier information request, determining, by the eUICC, presence of one or more network operator profiles that is in an enabled state and providing a response to the identifier information request based on a result of the determining, where the response includes identifier information.

The providing the response may include at least one network operator profile in the enabled state, the identifier information in the response is generated based on unique identifier information of the eUICC and in response to the determining yielding that at least one of the at least one network operator profile is in the enabled state, the identifier information in the response is generated based on identifier information of the network operator profile that is in the enabled state.

The unique identifier information of the eUICC may include at least one identifier information field selected from among a major industry identifier (MII) field, a manufacturer identifier number field, a manufacturer private number field, and a Luhn check digit field.

The identifier information of the network operator profile may include an integrated circuit card identification (ICCID) or a modified ICCID.

The request may be an ICCID information request, and the providing the response to the ICCID information request includes: in response to the determining yielding that none of the network operator profiles is in the enabled state, information in the response is generated based on the unique identifier information of the eUICC and in response to the determining yielding that one or more of the network operator profiles are in the enabled state, the identifier information in the response is generated in ICCID format and is based on the identifier information of the network operator profile that is in the enabled state.

In response to the determining yielding that said at least one of the at least one network operator profile is in the enabled state in the eUICC, further determining whether more than one of said at least one network operator profile is enabled, and in response to the further determining yielding that more than said one of the at least one network profile is enabled, the identifier information in the response is generated based on identifier information of a most-recently used network operator profile.

The eUICC may include at least one of ICCID information, unique identifier information of the eUICC, and at least one piece of profile identifier information.

The eUICC may store the ICCID information and the unique identifier information of the eUICC in a shared file system and may store the at least one piece of profile identifier information in a corresponding profile directory.

The eUICC may divide the file system in units of profiles and each unit may respectively store the ICCID information, the unique identifier information of the eUICC, and the at least one piece of profile identifier information.

Another aspect of an exemplary embodiment provides an embedded universal integrated circuit card (eUICC) including a processor configured to receive an identification information require, to determine presence of one or more network operator profiles that is in an enabled state and based on the received request, provide a response to the request based on a result of the determining, the response including identifier information.

The processor, in response to the determining yielding that none of the network operator profiles are in the enabled state, may provide information in the response that is generated based on unique identifier information of the eUICC and in response to the determining yielding that one or more network operator profile is in the enabled state, provide information in the response that is generated based on identifier information of the network operator profile that is in the enabled state.

The storage such as a memory may store the unique identifier information of the eUICC including at least one identifier information field selected from among a major industry identifier (MII) field, a manufacturer identifier number field, a manufacturer private number field, and a Luhn check digit field.

The memory may store an integrated circuit card identification (ICCID) or the identifier information of the network operator profile that is a modified ICCID.

The request may be an ICCID information request. In response to the determining yielding that none of the at least one network operator profile is in the enable state, the information in the response is generated based on the unique identifier information of the eUICC, and in response to the determining yielding that at least one of the network operator profiles is in the enabled state, the identifier information in the response is generated in an ICCID format and based on the identifier information of the network operator profile that is in the enabled state.

In response to the determining yielding that one or more of the network operator profiles is in the enabled state in the eUICC, the processor further determines the presence of more than one network operator profile being enabled, and in response to the further determining yielding that more than one of the network profiles is enabled, information in the response is generated based on identifier information of a most-recently used network operator profile.

The storage may store, as the identifier information, at least one of ICCID information, unique identifier information of the eUICC, and at least one piece of profile identifier information.

The storage may store the ICCID information and the unique identifier information of the eUICC in a shared file system and store the at least one piece of profile identifier information in a corresponding profile directory.

The storage may divide the file system in units of profiles and store the ICCID information, the unique identifier information of the eUICC, and the at least one piece of profile identifier information in a profile file system.

According to exemplary embodiments, the identifier management method and device of the eUICC, the eUICC may manage a unique identifier of the eUICC and an ICCID of a network operator, dynamically respond to an identifier request according to a state of a network operator profile of the eUICC, and respond to a request for ICCID information of the network operator from the outside of the eUICC.

BRIEF DESCRIPTION OF DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Exemplary embodiments may be variously modified and may include other exemplary embodiments. Specific exemplary embodiments will be illustrated in the accompanying drawings and be described in detail below.

However, it should be understood that an inventive concept is not limited to these exemplary embodiments, and may include any and all modification, variations, equivalents, substitutions, alternatives, and the like, falling within the spirit and scope thereof.

The terms 'first,' 'second,' and the like may be used to explain various other components, but these components are not limited to the terms. These terms are only used to distinguish one element from another. For example, a first component may be called a second component, and a second component may also be called a first component without departing from the scope of an inventive concept. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The terms used in the present specification are set forth to explain exemplary embodiments, and the scope of an inventive concept is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which an inventive concept belongs. Terms, such as terms that are generally used and have been in dictionaries, should be construed as having meanings matched with contextual meanings in the art. In this description, unless defined clearly, terms are not interpreted in an idealized or overly formal sense.

Hereinafter, exemplary embodiments will be described in detail with reference to the accompanying drawings. In describing exemplary embodiments, in order to facilitate the entire understanding, like numbers refer to like elements throughout the description of the figures and the repetitive description thereof will be omitted.

Figure 1:
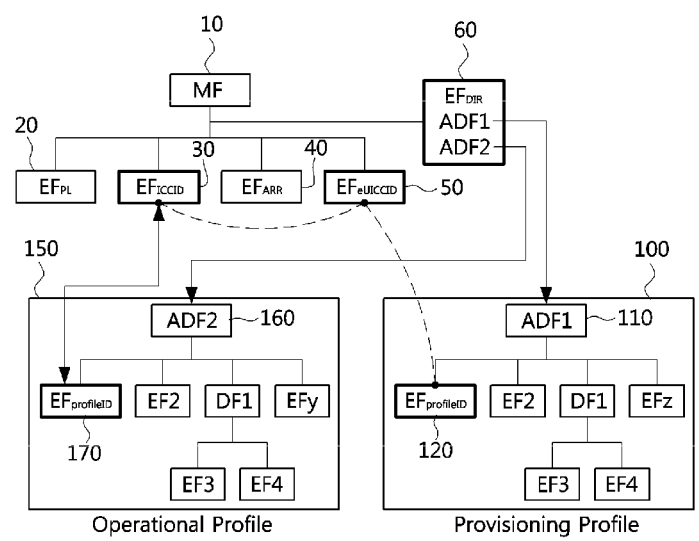
FIG. 1 is a diagram illustrating a file system structure of an eUICC according to an exemplary embodiment.

FIG. 1 is a diagram illustrating a file system structure of an eUICC according to an exemplary embodiment.

A file system structure of an eUICC according to an exemplary embodiment is explained with reference to FIG. 1.

In an exemplary embodiment, a separate file for storing an ID of an embedded universal integrated circuit card (eUICC) is provided, and this file is referred to as $EF_{eUICCID}$. In addition, an elementary file (EF) of the eUICC that stores an identification value corresponding to an integrated circuit card identification (ICCID) of the existing universal integrated circuit card (UICC) may be indicated as $EF_{eICCID}$.

As shown in FIG. 1, an eUICC file system has a master file (MF) 10, and may have, in the subcategory, a preferred languages elementary file ($EF_{PL}$) 20, an elementary file integrated circuit card identification ($EF_{ICCID}$) 30, an access rule reference elementary file ($EF_{ARR}$) 40, an elementary file directory ($EF_{DIR}$) 60, and additionally, an elementary file embedded universal integrated circuit card identification ($EF_{eUICCID}$) 50 having a value for identifying the eUICC.

Table 1 below shows an exemplary embodiment of a structure of the $EF_{eUICCID}$ file.

TABLE 1

Structure of $EF_{eUICCID}$ file

| Identifier: '2FF2' | Structure: transparent | | Mandatory |
|---|---|---|---|
| File size: 10 bytes | | Update activity: low | |
| Access Conditions: | | | |
| READ | ALW | | |
| UPDATE | NEVER | | |
| DEACTIVATE | ADM | | |
| ACTIVATE | ADM | | |
| Bytes | Description | M/O | Length |
| 1-10 | Identification number of eUICC | M | 10 bytes |

The file system of the eUICC may generate the $EF_{eUICCID}$ file according to the $EF_{ICCID}$ file structure of the UICC, and an eUICC ID value may be generated corresponding to an ICCID value system. Here, a nation code value among elements of the ICCID value, which is defined in International Telecommunications Union-Telecommunication Standardization Sector (ITU-T), may be used as a dedicated code for an eUICC service.

In an exemplary embodiment, the term profile means a module designed for performing post personalization of a network access authentication module, which is provided by the existing removable UICC, on the eUICC.

The profile is a module including a network access application and a network access credential, which includes parameter data, a file structure, etc. that are used to access one or more networks. The profile can be accessed with a unique value, for example, a profile ID on the eUICC.

The profile includes a provisioning profile, an operational profile (hereinafter referred to also as a network operator profile), etc.

The provisioning profile is a profile including a network access application and a communication network access credential such that communication between the eUICC and a subscriber manager-secure routing (SM-SR) may be allowed to manage the eUICC and profile.

Here, the SM is an entity that is mainly responsible for managing information on the eUICC, managing information about several mobile communication operators, and changing the information when a mobile communication operator is changed. The SM may be referred to as a "subscription management system" and may be classified into subordinate entities such as an SM-secure routing (SM-SR) and an SM-data preparation (SM-DP), which is considered herein to collectively refer to both of the subordinate entities.

The network operator profile is a profile including one or more network access applications and their associated access credentials.

The state of the profile may be divided into an enabled state and a disabled state.

The enabled state is a state in which a profile can be installed and network access applications belonging to the profile can be selected.

The disabled state is a state in which a profile is installed but network access applications belonging to the profile cannot be selected.

Referring to FIG. 1, a network access application (NAA) of each profile may have application dedicated files (ADFs) 110 and 160 as an access point that is used for an external module to enter the NAA, and includes profile identifier files 120 and 170 named as $EF_{ProfileID}$, which manage profile identifier values in the respective ADFs.

The profile identifier file $EF_{ProfileID}$ is a file that is present below the ADF of the network access application (NAA) of the profile, which is a file that stores a profile identifier value.

For example, an external object such as a terminal or SM may obtain the profile identifier information by querying the profile identifier file $EF_{ProfileID}$ whenever necessary.

Accordingly, a response to the profile identifier information request can be easily implemented by using $EF_{ProfileID}$ without performing complicated processing or changing the existing UICC file structure in order to find the profile identifier information.

The eUICC may set, in the profile identifier file $EF_{ProfileID}$ 120 and 170, the ICCID value of the network operator or its modified value, which are recorded on the UICC. However, since the provisioning profile 100 is installed in the eUICC before the network operator is determined, the profile identifier file $EF_{ProfileID}$ 120 of the provisioning profile may set the eUICC ID value or the modified value of the eUICC ID value.

When the eUICC is installed, the eUICC should set identifiers of respective profiles to have unique values such that the identifiers of the profiles are different from each other.

In order to satisfy the above requirement, a separate value system for the profile identifier may be defined or the ICCID value of the existing UICC network operator or its modified value may be used as the profile identifier value.

Table 2 below represents a structure of an $EF_{ProfileID}$ file having the profile identifier value that is present below the ADF of the network access application of the profile.

TABLE 2

Structure of $EF_{ProfileID}$ file

| Identifier: '6FF2' | Structure: transparent | | Mandatory |
|---|---|---|---|
| File size: X bytes | | Update activity: low | |
| Access Conditions: | | | |
| READ | ALW | | |
| UPDATE | NEVER | | |
| DEACTIVATE | ADM | | |
| ACTIVATE | ADM | | |
| Bytes | Description | M/O | Length |
| 1-10 | Identification number of Profile | M | X bytes |

For example, for the network operator profile, the eUICC may set a value of the profile identifier file $EF_{ProfileID}$ according to the ICCID value system of a network operator, and may set a modified value by adding a specific code or modifying some of digits based on the ICCID value.

Figure 2:
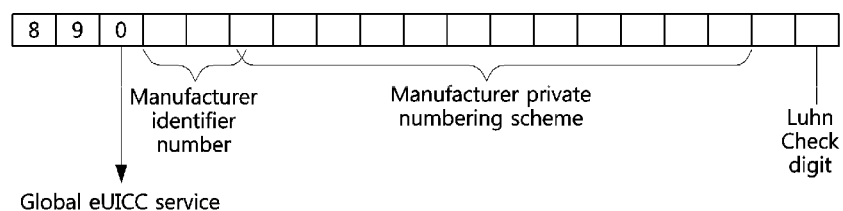
FIG. 2 is a diagram illustrating an eUICC ID field according to an exemplary embodiment.

FIG. 2 is a diagram of an eUICC ID field according to an exemplary embodiment.

Referring to FIG. 2, the eUICC uses "89" as a value of a major industry identifier (MII) in an eUICC ID, which is allocated for a communication. In addition, a third character '0' indicates a global eUICC service, and in addition, may include a manufacturer identifier number, manufacturer private number, and a Luhn check digit.

In an exemplary embodiment, the manufacturer identifier number may be variously set to an eUICC manufacturer code, a terminal manufacturer code, or a SM operator code.

The manufacturer private number is a field that is allocated to a system that is arbitrarily set by a manufacturer of the eUICC.

Figure 3:
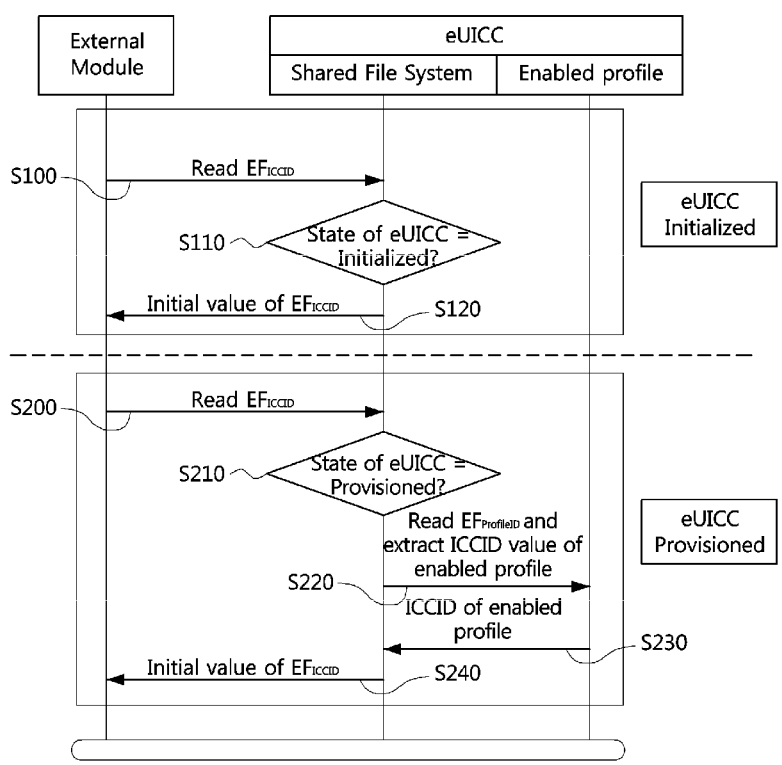
FIG. 3 is a flowchart illustrating a method of providing an identifier for each eUICC state according to a request to read an ICCID identifier file according to an exemplary embodiment.

FIG. 3 is a flowchart illustrating a method of providing an identifier for each eUICC state according to a request to read an ICCID identifier file according to an exemplary embodiment.

A shared file system shown in FIG. 3 denotes a module that manages files $EF_{ICCID}$, $EF_{DIR}$, and $EF_{eUICCID}$ below the master file (MF) on the eUICC and provides an interface for external interworking.

The shared file system of the eUICC receives a request to read the ICCID identifier file $EF_{ICCID}$ from an external module (in operation S100).

The external module may transmit the request to read the identifier file $EF_{ICCID}$ so that the eUICC may obtain the ICCID information in the same manner as that of the existing UICC.

The shared file system of the eUICC that has received the $EF_{ICCID}$ read request from the external module determines whether the state of the eUICC is initialized (in operation S110).

According to an exemplary embodiment, the state of the eUICC may be divided into a pre-initialized state, an initialized state, a provisioned state, and a terminated state.

According to an exemplary embodiment, the pre-initialized state is a state in which the eUICC includes only an operating system and an access credential therein.

According to an exemplary embodiment, the initialized state is a state in which the eUICC includes a profile management credential and a profile installation credential or a credential generating method.

According to an exemplary embodiment, the provisioned sate is a state in which the eUICC includes at least one profile that is in an enabled state.

According to an exemplary embodiment, the terminated state is a state in which the eUICC is no longer operational.

When the network operator profile is in the initialized state, that is, in a disabled state, the shared file system of the eUICC provides an initial value of the $EF_{ICCID}$ that is present in the shared file system corresponding to the read request from an external module (in operation S120).

According to an exemplary embodiment, the initial value of the $EF_{ICCID}$ uses a value of the $EF_{eUICCID}$.

In addition, the shared file system of the eUICC may provide the initial value of the $EF_{ICCID}$ when the shared file system may correspond to the $EF_{ICCID}$ read request from the external module even in a state other than the provisioned state.

The shared file system of the eUICC receives the request to read the ICCID identifier file $EF_{ICCID}$ from the external module (in operation S200).

The external module may perform the request to read the identifier file $EF_{ICCID}$ to obtain the ICCID information even from the eUICC in the same manner as that of the existing UICC.

The shared file system of the eUICC that has received the $EF_{ICCID}$ read request of the external module determines whether the state of the eUICC is the provisioned state (in operation S210).

When the eUICC is in the provisioned state, the shared file system of the eUICC may request the profile that is in an enabled state to read the $EF_{ProfileID}$ or extract the ICCID value (in operation S220).

The shared file system may request to read a value of the $EF_{ProfileID}$ when the ICCID of the network operator is stored in the $EF_{ProfileID}$ without modification and used as the profile identifier and may request to extract the ICCID value when the ICCID of the network operator is modified and stored in the $EF_{ProfileID}$ and used as the profile identifier.

The profile that is in the enabled state provides the shared file system of the eUICC with an ICCID value stored as the profile identifier or ICCID information generated by performing a modification on or an extraction from the stored profile identifier (in operation S230).

In addition, according to an exemplary embodiment, when there are several profiles that are in the enabled state, the shared file system may request a most-recently selected profile and a profile of a most-recently selected network access application to extract the ICCID information.

In addition, according to an exemplary embodiment, a user or terminal may select any one from among the profiles that are in an enabled state to request the selected profile to extract the ICCID information.

The shared file system of the eUICC that has acquired the ICCID information in the enabled profile provides the ICCID information to the external module that has requested the ICCID information (in operation S240).

Figure 4:
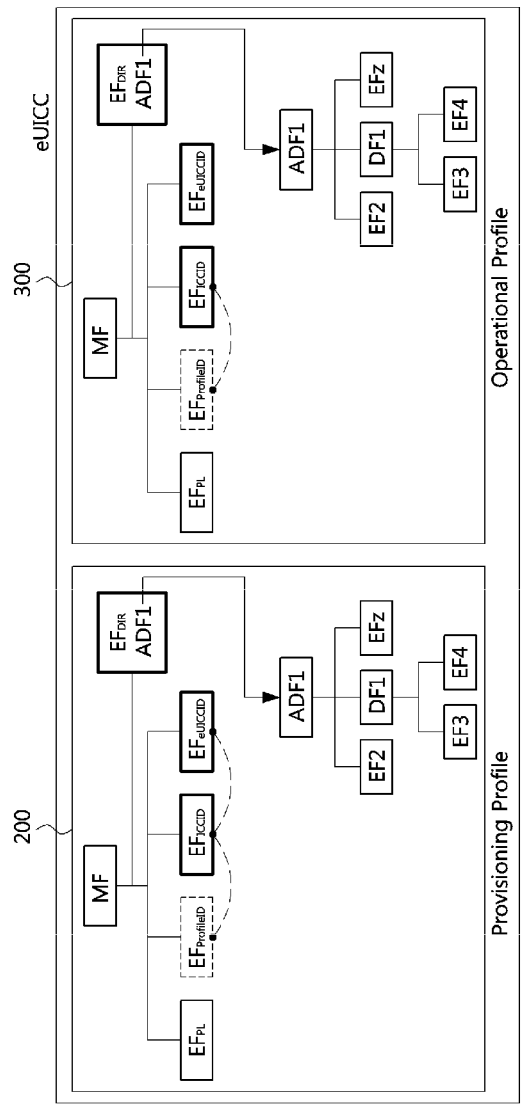
FIG. 4 is a view illustrating another file system structure according to an exemplary embodiment.

FIG. 4 is a diagram illustrating a file system structure according to an yet another exemplary embodiment.

The eUICC may configure an internal profile and a file system structure differently from an exemplary file system structure described above with reference to FIG. 1.

FIG. 4 is a diagram illustrating a configuration in which each profile has a separate file system according to an exemplary embodiment.

Similarly to an exemplary configuration described above with reference to FIG. 1, each profile has a master file, and there are an $EF_{PL}$, an $EF_{ICCID}$, and an $EF_{DIR}$ below the master file. Since the $EF_{ProfileID}$ file that stores the profile identifier is a structure in which each profile has a separate file system, the $EF_{ProfileID}$ file is present below the master file (MF) unlike an exemplary configuration described above with reference to FIG. 1. The $EF_{eUICCID}$ file that stores an identifier of the eUICC is present below the master file (MF) similar to the exemplary configuration described above with reference to FIG. 1.

The provisioning profile may use the eUICC ID value as the ICCID information value, and an identifier of the provisioning profile may also use the eUICC ID information value itself and a value modified based on the eUICC ID.

A left part of FIG. 4 shows an example of the provisioning profile 200. In FIG. 4, the $EF_{eUICCID}$ file, the $EF_{ICCID}$ file, and the $EF_{ProfileID}$ file which are shown as connected together by a dotted line indicate that these three files may use the ICCID information value as the eUICC identifier, the profile identifier, and the ICCID information value, respectively.

The network operational profile 300 may allocate and record an ICCID value of an operator in the profile when the profile is installed, and records the ICCID value of the network operator on the $EF_{ICCID}$ file, like the existing UICC.

In addition, the network operator profile may have the $EF_{eUICCID}$ file such that the eUICC ID value can be referenced by the external object to manage the eUICC.

According to an exemplary embodiment, when the profile has a separate file system such as the one shown in FIG. 4, a structure and value system of the $EF_{eUICCID}$ file may be analogous to those of Table 1 and FIG. 2. The structure of the $EF_{ProfileID}$ file is the same as that of Table 2, but a system of a file identifier (FID) may be configured in the form of '2FXX' according to the ISO/IEC 7816-4 specification.

When a request to refer the $EF_{ICCID}$ value is received from the outside, a profile that is in the enabled state may provide the $EF_{ICCID}$ value, regardless of the state of the eUICC.

In addition, when there are several profiles that are in the enabled state, a most-recently selected profile and a profile of a most-recently selected network access application may provide the ICCID information.

Figure 5:
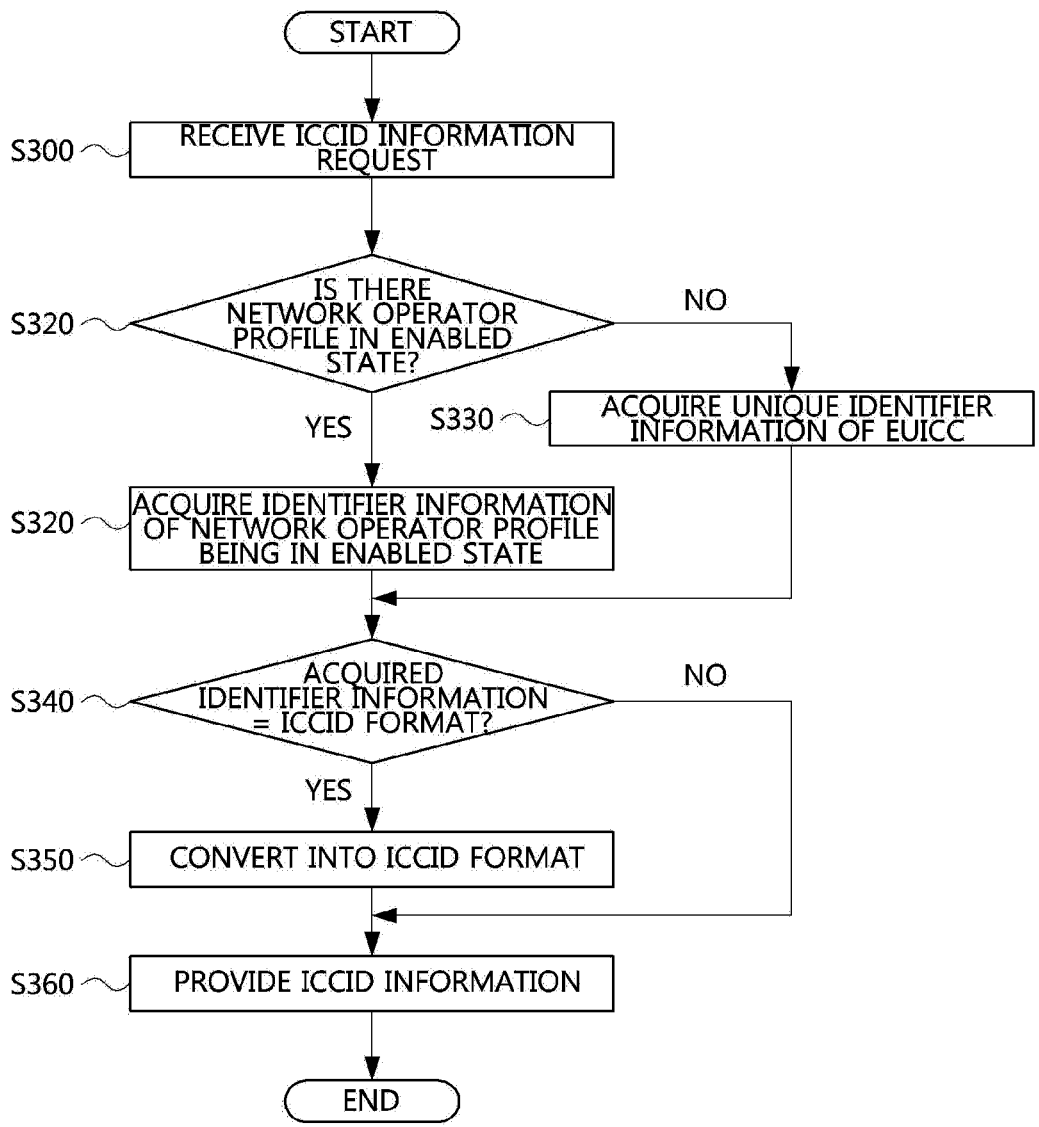
FIG. 5 is a flowchart illustrating processing an ICCID information request according to an exemplary embodiment.

FIG. 5 is a flowchart illustrating a method of processing an ICCID information request according to an exemplary embodiment.

The eUICC receives an ICCID information request from the outside (in operation S300). In an exemplary embodiment, the outside may include a base station, an access server, or other external entity with a processor and a memory which facilitates network access.

Here, the ICCID information request is a representative example of the identifier information of the eUICC.

Upon receiving the ICCID information request, the eUICC determines whether there is the network operator profile that is in the enabled state (in operation S310).

When the determination result is that there is the network operator profile that is in the enabled state, the eUICC acquires identifier information from the identifier file of the network operator profile that is in the enabled state (in operation S320).

When the determination result is that there is no network operator profile that is in the enabled state, the eUICC acquires identifier information from a unique identifier file of the eUICC (in operation S330).

The eUICC determines whether the identifier information that is acquired from the identifier file of the network operator profile or the unique identifier file of the eUICC has the ICCID format (in operation S340).

When the determination result is that the acquired identifier information has a different format from the ICCID information, the eUICC performs conversion into the ICCID information format (in operation S350).

For example, when the identifier information acquired from the identifier information file in the eUICC has a modified format of the ICCID, the eUICC may perform conversion into the ICCID format.

The eUICC provides the ICCID information acquired from the file storing the identifier information, corresponding to the ICCID information request received from the outside (in operation S360).

Figure 6:
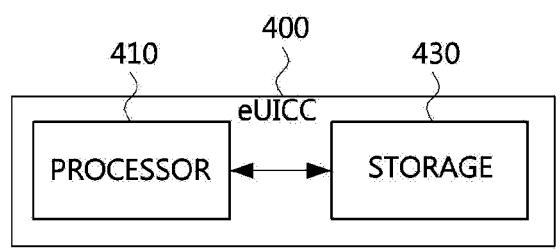
FIG. 6 is a block diagram illustrating an eUICC according to another exemplary embodiment.

FIG. 6 is a block diagram illustrating an eUICC according to another exemplary embodiment.

The eUICC 400 is configured to have a processor 410 and a storage 430 in order to perform identifier management.

The processor 410 of the eUICC determines whether there is the network operator profile that is in the enabled sate according to a received identifier information request and provides identifier information corresponding to the received identifier information request according to a result of the determination.

In addition, the processor 410 of the eUICC provides information generated based on the unique identifier information of the eUICC as the identifier information corresponding to the identifier information request when there is no network operator profile that is in the enabled state in the eUICC, and provides information generated based on the identifier information of the network operator profile that is in the enabled state as the identifier information corresponding to the identifier information request when there is the network operator profile that is in the enabled state in the eUICC.

In addition, in an exemplary embodiment, when the received identifier information request is an ICCID information request, the processor 410 may provide the information generated based on the unique identifier information of the eUICC as the identifier information corresponding to the identifier information request when there is no network operator profile that is in the enabled state in the eUICC, and may provide the generated information as identifier information having an ICCID format generated based on the identifier information of the network operator profile that is in the enabled state when there is the network operator profile that is in the enabled state in the eUICC.

In addition, in an exemplary embodiment, when there is the network operator profile that is in the enabled state in the eUICC and there are two or more network operator profiles that are in the enabled state, the processor 410 may provide information generated based on the identifier information of the most-recently used network operator profile as the identifier information corresponding to the identifier information request.

The storage 430 stores unique identifier information of the eUICC including at least one identifier information field among a major industry identifier (MII), a manufacturer identifier number, a manufacturer private number, and a Luhn check digit.

The storage 430 may store the ICCID or the identifier information of the network operator profile that is obtained by performing conversion on the ICCID.

The storage 430 may store at least one of the ICCID information, the unique identifier information of the eUICC, and at least one piece of the profile identifier information as the identifier information.

The storage 430 may store the ICCID information and the shared identifier information of the eUICC in the shared file system and store at least one piece of the profile identifier information in a corresponding profile directory, divide the file system in units of profile, and store the ICCID information, the shared identifier information of the eUICC, and the at least one piece of the profile identifier information in a file system of the profile. The storage 430 may be a memory according to an exemplary embodiment.

While example embodiments have been described in detail, it should be understood that various changes, substitutions, and alterations may be made herein without departing from the scope and spirit of an inventive concept.

The above description of exemplary embodiments is provided for the purpose of illustration, and it will be understood by those skilled in the art that various changes and modifications may be made without changing a technical conception and/or any essential features of exemplary embodiments. Thus, above-described exemplary embodiments are exemplary in all aspects, and do not limit the present disclosure.

The invention claimed is:

1. A method for identifier management, the method comprising:
   receiving, by an embedded universal integrated circuit card (eUICC) that is installed in a terminal device, an identifier information request; and
   determining, by the eUICC, whether or not at least one network operator profile that is in an enabled state exists; and
   providing a response comprising identifier information to the identifier information request based on a result of the determining,
   wherein the identifier information is generated based on unique identifier information of the eUICC based on determining that none of the at least one network operator profile is in the enabled state, and
   wherein the identifier information is generated based on an identifier of the at least one network operator profile that is in the enabled state, instead of the identifier of the eUICC, based on determining that at least one of the at least one network operator profile is in the enabled state.

2. The method of claim 1, wherein the unique identifier information of the eUICC comprises at least one identifier information field selected from among a major industry identifier (MII) field, a manufacturer identifier number field, a manufacturer private number field, and a Luhn check digit field.

3. The method of claim 1, wherein the identifier information of the at least one network operator profile in the enabled state comprising one of an Integrated Circuit Card Identification (ICCID) and a modified ICCID.

4. The method of claim 1, wherein the identifier information request is an ICCID information request and wherein the providing the response to the ICCID information request comprises:
   in response to determining yielding that none of the at least one network operator profile is in the enabled state, the identifier information in the response is generated based on the unique identifier information of the eUICC; and
   in response to determining yielding that at least one of the at least one network operator profile is in the enabled state, the identifier information in the response is generated in ICCID format and is based on the identifier information of the at least one network operator profile that is in the enabled state.

5. The method of claim 1, in response to the determining yielding that said at least one of the at least one network operator profile is in the enabled state in the eUICC, further determining whether more than one of said at least one network operator profile is enabled, and in response to further determining yielding that more than said one of the at least one network operator profile is enabled, the identifier information in the response is generated based on identifier information of a most-recently used network operator profile.

6. The method of claim 1, wherein the eUICC stores at least one of ICCID information, the unique identifier information of the eUICC, and at least one piece of profile identifier information.

7. The method of claim 6, wherein the eUICC stores the ICCID information and the unique identifier information of the eUICC in a shared file system and stores the at least one piece of profile identifier information in a corresponding profile directory.

8. The method of claim 6, wherein a file system in the eUICC is divided in units of profiles and each of said units respectively store the ICCID information, the unique identifier information of the eUICC, and the at least one piece of profile identifier information.

9. The method of claim 1, wherein the eUICC stores a plurality of network operator profiles including said at least one network operator profile, each of the plurality of network operator profiles comprises an operational profile and a provisioning profile which comprises a network access application and a communication network access credential.

10. The method of claim 1, wherein the enabled state indicates that the at least one network operator profile provides a shared file system of the eUICC with an Integrated Circuit Card Identification (ICCID) value stored as a profile identifier.

11. An embedded universal integrated circuit card (eUICC) comprising:
   a processor configured to:
      receive an identifier information request,
      make a determination whether or not at least one network operator profile that is in an enabled state exists, based on the received request, and
      provide a response comprising identifier information to the identifier information request based on a result of the determination; and
   a memory configured to store the identifier information,
   wherein the identifier information is generated based on unique identifier information of the eUICC based on determining that none of the at least one network operator profile is in the enabled state, and wherein the identifier information is generated based on an identifier of the at least one network operator profile that is in the enabled state, instead of the identifier of the eUICC, based on determining that at least one of the at least one network operator profile is in the enabled state.

12. The eUICC of claim 11, wherein the memory stores the unique identifier information of the eUICC comprising at least one identifier information field selected from among a major industry identifier (MII) field, a manufacturer identifier number field, a manufacturer private number field, and a Luhn check digit field.

13. The eUICC of claim 11, wherein the memory stores the identifier information of the at least one network operator profile comprising one of an Integrated Circuit Card Identification (ICCID) and a modified ICCID.

14. The eUICC of claim 11, wherein the identifier information request is an ICCID information request, and wherein, in response to the processor determining that none of the at least one network operator profile is in the enabled state, the identifier information in the response is generated based on the unique identifier information of the eUICC, and wherein in response to the processor determining that at least one of the at least one network operator profile is in the enabled state, the identifier information in the response is generated in an ICCID format and based on the identifier information of the at least one network operator profile that is in the enabled state.

15. The eUICC of claim 11, wherein, in response to the processor determining that said at least one of the at least one network operator profile is in the enabled state in the eUICC, the processor further determines whether more than one of said at least one network operator profile being enabled exist, and in response to the processor further determining that more than said one of the at least one network operator profile being enabled exist, the identifier information in the response is generated based on identifier information of a most-recently used network operator profile.

16. The eUICC of claim 11, wherein the memory is configured to store, as the identifier information, at least one of ICCID information, the unique identifier information of the eUICC, and at least one piece of profile identifier information.

17. The eUICC of claim 16, wherein the memory is configured to store the ICCID information and the unique identifier information of the eUICC in a shared file system and stores the at least one piece of profile identifier information in a corresponding profile directory.

18. The eUICC of claim 16, wherein the memory is configured to store a file system which is divided into units of profiles such that each of said units respectively store the ICCID information, the unique identifier information of the eUICC, and the at least one piece of profile identifier information in a profile file system.

19. The eUICC of claim 11, wherein the enabled state indicates that the at least one network operator profile provides a shared file system of the eUICC with an Integrated Circuit Card Identification (ICCID) value stored as a profile identifier.

* * * * *